(12) United States Patent
Justen et al.

(10) Patent No.: US 7,325,831 B2
(45) Date of Patent: Feb. 5, 2008

(54) ACTIVE IMPACT PROTECTION SYSTEM

(75) Inventors: Rainer Justen, Altdorf (DE); Michael Fehring, Neuhausen auf den Fildern (DE); Axel Ouerengässer, Fellbach-Schmiden (DE); Michael Kreim, Esslingen (DE); Herbert Müller, Nürnberg (DE); Edgar Prottengeier, Nürnberg (DE); Wolfgang Nagl, Allersberg (DE); Markus Happich, Feucht-Moosbach (DE)

(73) Assignee: DaimlerChrysler AG, Stuttgart (DE)

( * ) Notice: Subject to any disclaimer, the term of this patent is extended or adjusted under 35 U.S.C. 154(b) by 284 days.

(21) Appl. No.: 10/534,146

(22) PCT Filed: Sep. 24, 2003

(86) PCT No.: PCT/DE03/03187

§ 371 (c)(1),
(2), (4) Date: Jun. 28, 2005

(87) PCT Pub. No.: WO2004/043748

PCT Pub. Date: May 27, 2004

(65) Prior Publication Data

US 2005/0236816 A1    Oct. 27, 2005

(30) Foreign Application Priority Data

Nov. 9, 2002 (DE) ............................. 102 52 180

(51) Int. Cl.
    B60R 21/04    (2006.01)
(52) U.S. Cl. ..................................... 280/753
(58) Field of Classification Search ................ 280/753, 280/752, 751, 748
    See application file for complete search history.

(56) References Cited

U.S. PATENT DOCUMENTS

| 5,131,681 | A  | * | 7/1992  | Wetzel et al. ............... 280/753 |
| 5,344,184 | A  | * | 9/1994  | Keeler et al. ............. 280/730.1 |
| 5,413,379 | A  | * | 5/1995  | Koma ......................... 280/752 |
| 5,476,283 | A  | * | 12/1995 | Elton ......................... 280/753 |
| 5,876,061 | A  | * | 3/1999  | Stavermann ................ 280/732 |
| 6,283,508 | B1 | * | 9/2001  | Nouwynck et al. ......... 280/753 |
| 6,302,437 | B1 | * | 10/2001 | Marriott et al. ............ 280/732 |
| 6,874,811 | B2 | * | 4/2005  | Enders et al. ............ 280/730.1 |
| 7,261,318 | B2 | * | 8/2007  | Enders ....................... 280/732 |
| 2003/0001372 | A1 | * | 1/2003  | Browne et al. ............ 280/751 |
| 2005/0161921 | A1 | * | 7/2005  | Higuchi ..................... 280/735 |
| 2005/0236816 | A1 | * | 10/2005 | Justen et al. ............ 280/728.3 |

FOREIGN PATENT DOCUMENTS

DE    40 02 448 A1    8/1990

(Continued)

Primary Examiner—Paul N. Dickson
Assistant Examiner—Karen J. Amores
(74) Attorney, Agent, or Firm—Wildman, Harrold, Allen & Dixon LLP

(57) ABSTRACT

The invention relates to an active impact protection system (1) for a knee area and/or a lower leg area of a vehicle occupant in a motor vehicle, particularly in a passenger car. The impact protection system (1) comprises an impact element (2) that can be extended toward the vehicle occupant out of a passive position and into an active position by means of a drive device (4). A particularly advantageous design results when the impact element (2) is formed by a lid of a passenger-side glove compartment (3).

16 Claims, 2 Drawing Sheets

FOREIGN PATENT DOCUMENTS

Figure 1:
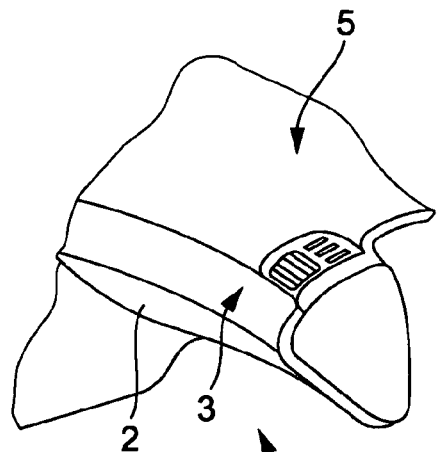

| | | |
|---|---|---|
| DE | 42 09 604 C2 | 12/1996 |
| DE | 297 10 745 U1 | 11/1997 |
| DE | 197 47 423 C1 | 4/1999 |
| DE | 197 49 585 A1 | 5/1999 |
| DE | 299 02 032 U1 | 5/1999 |
| DE | 198 42 672 A1 | 3/2000 |
| DE | 198 82 315 T1 | 4/2000 |
| DE | 100 58 430 A1 | 9/2001 |
| DE | 100 38 567 A1 | 2/2002 |
| DE | 100 55 051 A1 | 5/2002 |
| EP | 0 885 783 A1 | 12/1998 |

* cited by examiner

ACTIVE IMPACT PROTECTION SYSTEM

This application claims the benefit of the Sep. 24, 2003 filing date of International Patent Application No. PCT/DE2003/003187 and German Patent Application No. DE 102 52 180.8, filed Nov. 9, 2002.

The present invention relates to an active impact protection system for a knee area and/or a lower leg area of a vehicle occupant in a motor vehicle, in particular in a passenger vehicle, having the features of the preamble of claim 1.

Such an impact protection system is known from U.S. Pat. No. 6,283,508 B1, for example, and includes an impact element that is movable by a driving device out of a passive position and into an active position in the direction of the vehicle occupants. This impact element may be formed by a lid of a passenger-side glove compartment. This impact lid cooperates with the driving device so that a stowage compartment of the glove compartment does not move along into the active position when the impact lid is deployed, but instead it remains in its starting position.

Another impact protection device is known from EP 0 885 783 A1, in which the impact element may also be formed by a lid of a passenger-side glove compartment. The driving device, which is formed by an inflatable airbag, is also arranged so that in the event of a crash the impact lid can be adjusted suddenly into the active position together with a stowage container of the glove compartment.

German Patent DE 100 58 430 A1 discloses an extensible restraint device for preventing and/or reducing impact injuries to vehicle occupants in an accident-induced deceleration of the vehicle; said device includes an impact element which can be moved from a resting position in the vehicle body in the direction of the occupant of the vehicle. To do so, a drive is provided, making it possible to move the impact element between a retracted passive position and an extended active position. This means that in the event of a crash, the impact element actively moves forward toward the occupant of the vehicle and/or the knee area and/or lower leg area of the passenger. Therefore, a greater distance is available for deceleration of the respective vehicle occupant, so that the effective braking forces and thus the risk of injury can be reduced.

German Patent DE 197 49 585 A1 discloses a passive impact protection system having an energy-absorbing impact element. In contrast with active impact protection, the impact element in passive impact protection remains essentially in its installed position, so the respective vehicle occupant comes in contact with the stationary impact element at a rather high relative speed in the event of a crash. With the known passive impact protection, the stationary impact element is formed by the lid of a floor airbag.

DE 100 38 567 A1 and DE 100 55 051 A1 disclose other passive impact protection devices with which a stationary impact element is formed by the bottom of a compartment that is open toward the interior of the vehicle.

The present invention is concerned with the problem of providing an improved embodiment for active impact protection of the type defined in the preamble that can be integrated visually in particular into the automotive interior.

This problem is solved according to this invention by the object of the independent claim. Advantageous embodiments are the object of the dependent claims.

This invention is based on the general idea of designing a lid of a glove compartment as an actively adjustable impact element. Due to this design, the glove compartment lid, which is referred to below as the impact lid, has an important additional function for personal safety. Since a glove compartment lid is integrated into the interior of a vehicle interior as a design element anyway, the design according to this invention yields a visually advantageous integration of the impact element into the automotive interior.

According to this invention, the glove compartment has a stowage container which is adjustable by means of the driving device of the impact lid together with the impact lid itself between a retracted closed position, in which the stowage container is closed and in which the impact lid is in its passive position, and an extended open position, in which the stowage container is accessible from the interior of the vehicle. With this combination of features, the driving device has the additional function of permitting an increase in comfort. With this invention, the driving device can move the impact lid together with the stowage container when the glove compartment is operated, whereas to activate the impact cover, the driving device extends the impact cover independently of the stowage container. As a result of this measure, the impact lid can be extended especially rapidly in the event of a crash, because the mass of the stowage container and the contents accommodated therein must not be moved along with the lid when the impact cover is activated.

A driving device for adjusting the impact lid may essentially be designed so as to yield suitable adjustment kinematics for the impact lid. However, an embodiment in which the driving device is designed so that it moves the impact lid essentially bidirectionally and unidirectionally has proven especially advantageous. In the event of a crash, this yields a uniform orientation of the braking forces or deceleration forces applied by the impact lid with respect to its direction of action.

In one embodiment, the driving device may have a drive train for moving the impact lid, the drive train being designed so that it permits the impact lid to be retracted into its passive position when a force is acting from the outside on the impact lid in the retraction direction, whereby the driving device has at least one damper element which inserted into the drive train and cooperates with it so that it dampens a driving force acting on the impact lid from the outside and propels the impact lid into its passive position. This means that the deceleration force and/or braking force generated by the impact protection system in the event of a crash depends on the speed with which the vehicle occupant propels the impact lid in its direction of retraction with his knees and/or lower legs.

According to a particularly expedient embodiment, the glove compartment may have a dust container which is adjustable by means of the driving device of the impact lid together with the impact lid itself between a retracted closed position, in which the dust container is closed and in which the impact lid is in its passive position, and an extended open position, in which the dust container is accessible from the interior of the vehicle. With this combination of features, the driving device has the additional function of permitting an increase in comfort.

In an embodiment of particular interest, the driving device moves the impact lid together with the dust container in the event of glove compartment operation, while it retracts the impact lid independently of the dust container for activation of the impact lid. As a result of this measure, the impact lid may be extended especially rapidly in the event of a crash because the weight of the dust container and the contents accommodated therein need not be entrained in activation of the impact lid.

In another advantageous embodiment, the driving device may extend the impact lid into a predetermined preventive position when the passenger has not engaged his seatbelt while the vehicle is being driven. This special situation can be recognized by an appropriate controller of the impact protection system, e.g., by the fact that a seat occupancy detector for the passenger's seat senses the presence of a passenger, a corresponding sensor sends the message that all the vehicle doors are closed, the vehicle engine has been started, but the seatbelt has not been engaged in the proper seatbelt lock. In the preventive position, which is expediently between the passive position and the maximally extended position of the impact lid, the path to be traveled in the event of a crash until impact of the vehicle occupant with the impact lid is shortened to thereby provide an absorption path. The risk of injury may be reduced thereby, at least at lower speeds.

In a further embodiment, the impact lid when moved into its preventive position can release the view of a warning for engaging the seatbelt that is visible to the passenger. This warning may be formed, for example, by a nameplate having a visually attractive design, in particular with lighting, to thereby instruct the passenger that it would be advantageous for the sake of his health to use the seatbelt. In addition, the preventive position may be selected in a targeted manner so that the impact lid is at least aesthetically unattractive to the passenger, so that for this reason alone, the passenger is prompted to properly engage his seatbelt.

Other important features and advantages of this invention are derived from the subclaims, the drawings and the respective description of the figures on the basis of the drawings.

It is self-evident that the features mentioned above and to be explained in greater detail below may be used not only in the particular combination indicated but also in other combinations or even alone without going beyond the scope of the present invention.

A preferred exemplary embodiment of this invention is depicted in the drawings and is explained in greater detail in the following description, where the same reference notation is used to refer to the same or functionally identical or similar parts.

Figure 3:
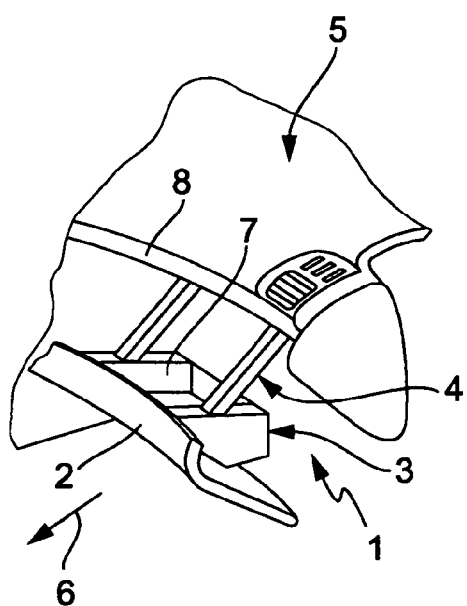
Figure 4:
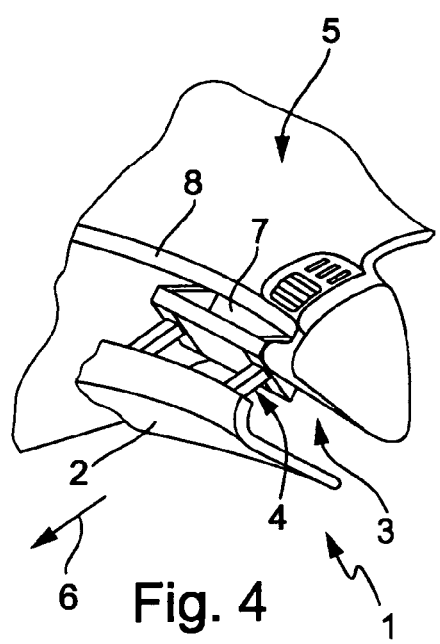
Figure 5:
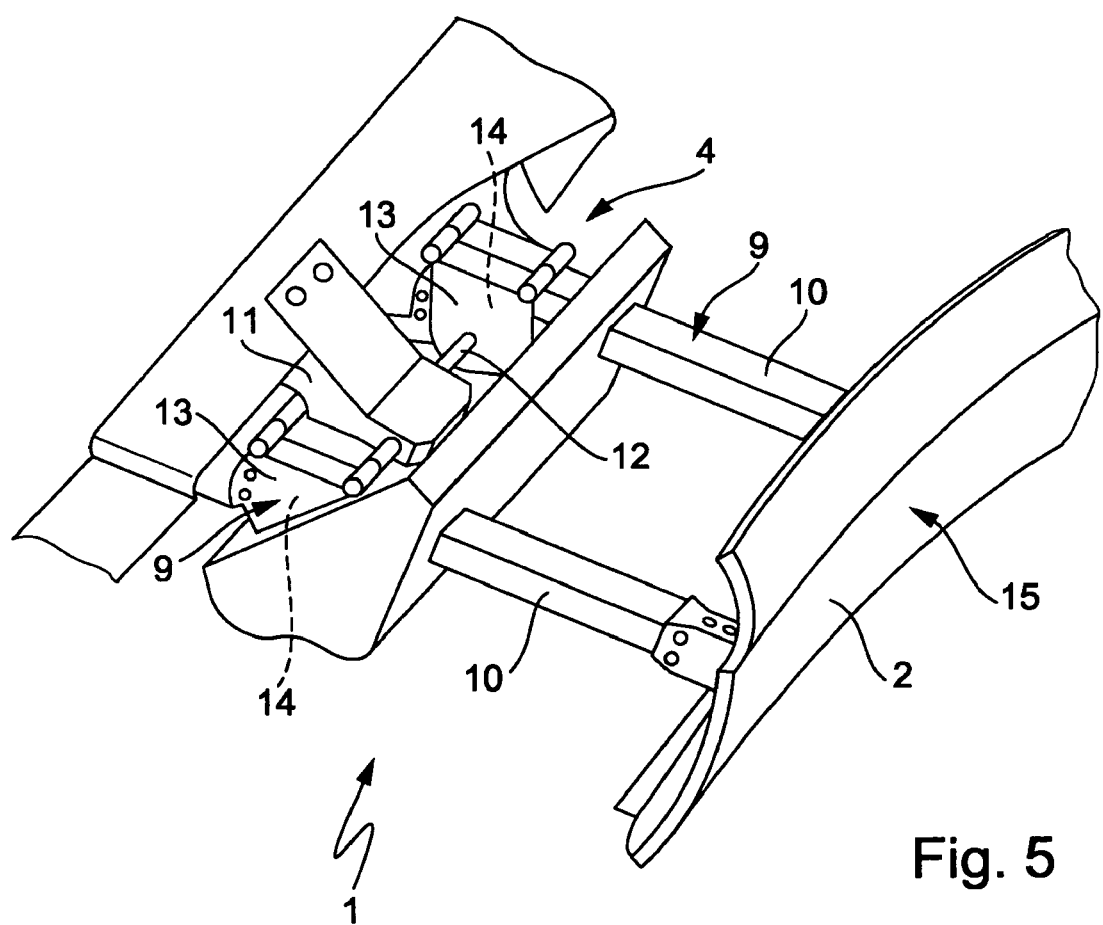

The drawings are schematic diagrams showing:

FIGS. 1 through 4 are perspective views of the inventive impact protection system illustrating different positions of an impact element, FIG. 5 is a perspective view similar to those in FIGS. 1 through 4, but from another direction of observation with a view of a driving device of the impact protection system.

Figure 2:
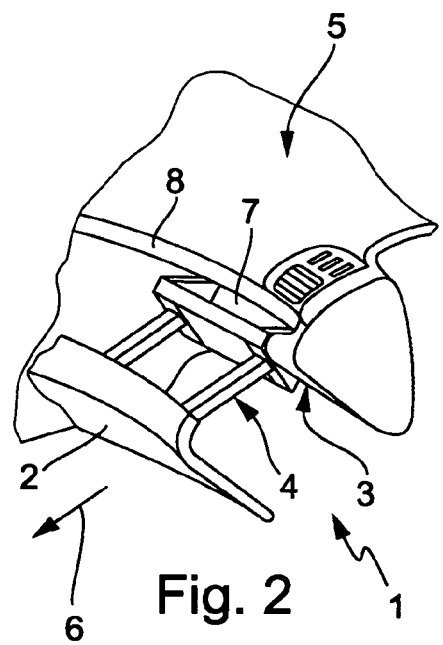

According to FIGS. 1 through 4, an active impact protection system 1 includes an impact element 2 which is formed according to this invention by a lid of a glove compartment 3. The impact element 2 is therefore also referred to as an impact lid 2 in the following text. The impact protection system 1 is active because its impact element 2, i.e., the impact lid 2 here, is movable by means of a driving device 4, which is explained in greater detail below with reference to FIG. 5, moving it out of a retracted passive position as depicted in FIG. 1 into an extended active position as depicted in FIGS. 2 and 3. Due to its configuration, the impact protection system 1 serves to protect the knee area and/or lower leg area of a vehicle occupant (not shown here), namely a passenger in a motor vehicle, preferably in a passenger vehicle. In addition, the impact protection system 1 serves to provide additional support in the knee area and the lower leg area in order to have on the whole a positive influence on the occupant kinematics in the event of a crash.

The glove compartment 3 is usually located on the passenger side of a vehicle, where it is integrated into the design of the dashboard 5. Since the impact element 2 forms the lid of the glove compartment 3, the impact protection system 1 and/or its impact element 2 is/are visually integrated into the dashboard 5, i.e., into the interior of the vehicle. When extended, the impact lid 2 moves toward the passenger according to an arrow 6.

In the preferred embodiment illustrated here, the driving device 4 is designed so as to yield a bidirectional, i.e., one-dimensional or linear adjustment movement for the impact lid 2. Therefore the distance between the retracted impact lid 2 and the knee area or lower leg area of the occupant that is to be protected is shortened particularly rapidly in the event of a crash. It is likewise possible to impart adjustment kinetics to the impact lid 2 in which in extension of the lid, it is additionally pivoted about a pivot axis running horizontally and across the longitudinal direction of the vehicle in order to thereby improve the supporting effect in the knee area and/or lower leg area, if necessary.

An embodiment in which the impact lid 2 is activated as a preventive measure, i.e., in the event of a possible collision, in particular as a function of pre-crash sensors, is preferred. When predetermined boundary conditions prevail such as those determined from driving dynamics and environment sensing, for example, such pre-crash sensors assume an increased probability of a crash. Such boundary conditions may be, for example: the simultaneous activation of an electronic stability system and an electronic brake assistance system and/or the detection of an obstacle by a distance measurement device with which a collision appears unavoidable because of the prevailing vehicle speed and direction of travel. For the case when the impact lid 2 is activated as a function of pre-crash sensors, the impact lid 2 may be extended comparatively rapidly into its active position.

In the event of a crash in particular, collision of the vehicle occupant with an impact lid 2 rapidly approaching him in the area of the knee and/or lower leg would be counterproductive, so in a preferred embodiment, the impact lid 2 is equipped with contact sensors (not shown here) designed so that when the impact lid 2 is extended, the sensors detect contact of the impact lid 2 with an obstacle, and a control unit of the driving device 4 is designed so that the extension movement is stopped immediately and in particular is locked when such contact occurs.

If in extension of the impact lid 2, contact with the knee and/or lower leg area does not occur, the impact lid 2 will continue to be extended up to a predetermined maximally extended end position in which, experience has shown, there is only a slight distance between the impact lid 2 and the knee and/or lower leg area of a passenger sitting correctly in the passenger seat.

At least for the case when activation of the impact lid 2 occurs as a function of pre-crash sensors, it is expedient to design the driving device 4 so that it causes the impact lid 2 to be retracted back into the passive position according to FIG. 1 when the anticipated crash fails to occur. This deactivation of the impact lid 2 then takes place at a retraction rate, which may be much lower than the extension rate for activation of the impact lid 2.

In the event of a crash, the impact lid in its active position serves as a mobile entrained impact protection system 1 which is also moved in the direction of travel together with the knee and/or lower leg area supported on it and thereby absorbs the energy of the movement. Furthermore, the impact lid 2 is advantageously designed so that at least in its passive position it forms a stationary, energy-absorbing, deformable impact protection system. To this extent, the impact lid 2 as such may be designed like a traditional passive impact element.

According to FIGS. 2 through 4, the glove compartment 3 has a dust container 7, which is designed in the manner of a drawer that is open at the top and is adjustable in the same direction as the impact lid 2. One particular feature of this is that the adjustment movement of the dust container 7 takes place with the same driving device 4 as the adjustment of the impact lid 2 and secondly can be performed together with the impact lid 2. Accordingly, the dust container 7 together with the impact lid 2 is adjustable between a retracted closed position according to FIG. 1 and an extended open position according to FIG. 3. In the closed position, the dust container 7 is optimally retracted and the impact lid 2 is in its passive position. In the open position according to FIG. 3, the dust container 7 and the impact lid 2 are extended to the extent that the dust container 7 is adequately accessible from the interior of the vehicle. Essentially, this open position may coincide with the maximally extended end position of the impact lid 2. Preferably, however, the impact lid 2 is extended only a small part of the maximum possible extension range to achieve a suitable open position for the dust container 7.

As indicated by FIGS. 2 and 3, in the preferred embodiment shown here, the impact lid 2 may also be adjusted independently of the dust container 7. This is advantageous when the impact lid 2 must be moved relatively rapidly to reach its active position. During this rapid adjustment movement, the dust container 7 may remain in its momentary position, in particular in its closed position according to FIG. 2. Therefore, the moment of inertia to be overcome by the driving device 4 is lower, so that a highly dynamic adjustment can be achieved for the impact lid 2. Thus in a variant, the driving device 4 permits a definitely smaller adjustment speed than the extension speed with which the driving device 4 extends the impact lid 2 for its activation. Furthermore, even when the dust container 7 is adjusted into its open position, the impact lid 2 may be extended even further independently of the dust container 7 in order to move the impact lid even closer to the knee area and/or lower leg area of the passenger for activation of the impact lid 2.

FIG. 4 shows the impact lid 2 extended into a predetermined preventive position in which the distance of the impact lid 2 from the knee area and/or lower leg area of the passenger is shortened. At any rate the impact lid 2 is not maximally extended in this preventive position but instead is only partially extended. The impact lid 2 is then moved by the driving device 4 into its preventive position according to FIG. 4 when a suitable control unit detects predetermined boundary conditions in which the preventive position may be helpful to prevent or reduce injuries in the event of a crash. As a priority, the impact lid 2 may be adjusted in its preventive position when the passenger has not engaged his seatbelt. In order not to interfere with the passenger in entering and leaving the vehicle, the preventive position should be set only when the passenger door or all vehicle doors are closed. As another condition, there should be a query, e.g., by means of a seat occupancy detector, to ascertain whether a passenger is sitting in the passenger seat at all. A query to determine whether the vehicle is being operated is also expedient, i.e., the impact lid 2 is then moved into its preventive position when the engine of the vehicle is also started when the conditions indicated above are met.

Since a contact sensor is expedient for activation of the impact lid 2, this may also be used in adjusting the impact lid 2 into its preventive position to stop the impact lid 2 and prevent its further extension in the event of a collision with an obstacle. The same is of course also true of extension of the impact lid 2 together with the dust container 7 when the impact lid 2 moves against an obstacle before reaching the open position of the dust container 7. Additionally or alternatively, a collision of the impact lid 2 with an obstacle can also be detected on the basis of the power consumption andlor torque uptake by an electric motor that extends the impact lid 2 by means of a suitable torque control and/or electric current control.

In the event of a crash, the impact lid 2 which has been moved into its preventive position is able to better protect the passenger who has not engaged his seatbelt, at least at lower driving speeds, than can a purely passive impact protection system. However, another important aspect of the preventive position is that the partially extended impact lid 2 is annoying to the driver and/or passenger to such an extent that the passenger could therefore be motivated to engage his seatbelt. Then as soon as the seatbelt has been engaged, the control unit deactivates the impact lid 2 and controls the driving device 4 for retracting the impact lid 2 into its passive position.

To improve this warning function of the preventive position of the impact lid 2, the impact lid 2 may make a warning for the passenger visible when it is extended to prompt the passenger to engage his seatbelt. Such a warning may be, for example, in the form of written characters and/or in a graphic display prompting the passenger to engage his seatbelt. For example, such a warning may be provided on a strip-shaped section 8 which is covered by the impact lid 2 in its passive position according to FIG. 1. The warning 8 may be provided with suitable lighting, which is coupled in particular to the vehicle lighting, to prompt the passenger that his seatbelt has not been engaged or has not been properly engaged even in the dark.

For the adjustment movement of the impact lid 2 into its preventive position and/or back out of its preventive position, the driving device 4 may be expediently be designed so that it keeps the adjustment speed much lower for this purpose than for the extension of the impact lid 2 for its activation.

The impact lid 2 may also be equipped with a clamping sensor (not shown here) which stops the driving device 4 in adjustment of the impact lid 2 into its passive position and/or in adjustment of the impact lid 2 together with the dust container 7 into its closed position as soon as the clamping sensor detects that the impact lid 2 and/or the dust container 7 has struck an obstacle in retraction. Such a clamping sensor, like the aforementioned contact sensor, may have pressure-sensitive mats as well as a device for monitoring the motor power when an electric motor is used for the driving device.

According to FIG. 5, the driving device 4 has a drive train 9 which is connected to the impact lid 2 and serves to move the impact lid 2. This drive train 9 here includes two parallel rods 10 which are designed here as gear racks, for example. Likewise, the rods 10 may also be designed as telescoping rods or as threaded rods. The drive train 9 also includes a drive member, which is formed by an electric motor 11 here. Likewise, pneumatic, hydraulic or other drives are also conceivable. In the embodiment shown here, the electric motor 11 drives two gear arrangements 13 in parallel via flexible drive shafts 12, these gear arrangements translating the incoming rotational movements into linear movements of the rods 10. Essentially, however, any other type of introduction of force into the rods 10 is also possible. The driving device 4 also moves the glove compartment's stowage container 7 between the retracted closed position and the extended open position.

According to a particularly advantageous embodiment, the drive train 9 is expediently designed so that it is possible to push the impact lid 2 passively back into its passive position. For example, a force acting in the retraction direction may act from the outside on the impact lid 2 according to an arrow 15. The impact lid 2 may thus yield in an impact against an extension direction. The drive train 9 includes at least one damper element 14. In the present case each rod 10 is assigned such a damper element 14 which is integrated into the respective gear 13. Accordingly, the reference line leading to the respective damper element 14 is shown as an interrupted line. These damper elements 14 are inserted into the drive train 9 and coupled to it in such a way that they dampen a force 15 acting on the impact lid 2 from the outside and driving the impact lid 2 in its retraction direction. In other words, the damper elements 14 decelerate the impact lid 2, which is driven into its passive position, with the braking force thereby generated being greater, the greater the speed at which the impact lid 2 is driven into its passive position. Such a damper element 14 may be designed as a rotary damper, for example, and may be arranged on the rotating side of the drive train 9.

The damper elements 14 are expediently activatable and deactivatable so that the electric motor 11 need not work against the resistance of the damper elements 14 in intentional retraction or extension of the impact lid 2 by the driving device 4. The damper elements 14 are expediently activated via a corresponding mechanical coupling or by a control unit only when the impact lid 2 is extended into its active position, i.e., when the impact lid is maximally extended or is stopped in its extension movement by an obstacle, usually the knee area and/or lower leg area of the passenger.

The invention claimed is:

1. An active impact protection system for a knee area and/or lower leg area of a vehicle occupant in a motor vehicle having an impact element which is extensible by means of a driving device (4) out of a passive position into an active position in a rearward direction of the vehicle and is formed by an impact lid (2) of a passenger-side glove compartment (3), characterized in that the glove compartment (3) has a stowage container (7) which is movable by means of the driving device (4) together with the impact lid (2) between a retracted closed position in which the impact lid (2) is in its passive position and an extended open position, in which the stowage container (7) is accessible, in operation of the glove compartment, the driving device (4) moves the impact lid (2) together with the stowage container (7), for activation of the impact lid (2), the driving device (4) extends the impact lid independently of the stowage container (7).

2. The impact protection system according to claim 1, characterized in that the driving device (4) moves the impact lid (2) bidirectionally and/or one-dimensionally.

3. The impact protection system according to claim 1, characterized in that the driving device (4) includes a drive train (9) for moving the impact lid (2), including retracting the impact lid (2) to its passive position in the event of a force (15) acting on the impact lid (2) from the outside in the direction of retraction, the driving device (9) having at least one damper element (14) disposed in the drive train (9) and cooperating with the latter to dampen a force (15) acting on the impact lid (2) from the outside and driving the impact lid (2) to its passive position.

4. The impact protection system according to claim 3, characterized in that the damper element (14) is activatable and deactivatable, and the damper element (14) is activated only when the impact lid (2) is extended, and is deactivated during active retraction and extension of the impact lid (2).

5. The impact protection system according to claim 1, characterized in that the driving device (4) extends the impact lid (2) during its activation until reaching a maximally extended end position or until a contact sensor or a control unit of the driving device (4) detects contact with an obstacle.

6. The impact protection system according to claim 1, characterized in that to activate the impact lid (2) a pre-crash sensor is provided, whereby the driving device (4) retracts the impact lid (2) back to the passive position when a presumed crash fails to occur.

7. The impact protection system according to claim 6, characterized in that the driving device (4) is designed so that the rate of retraction for deactivation of the impact lid (2) is lower than the rate of extension for activation of the impact lid (2).

8. The impact protection system according to claim 1, characterized in that the impact lid (2) functions as a mobile impact protection system (1) which is also moved in the event of a crash until reaching its passive position, and then in its passive position, it forms a stationary, energy-absorbing, deformable impact protection system (1).

9. The impact protection system according to claim 1, characterized in that the driving device (4) is designed so that the rate of adjustment for opening and closing the stowage compartment (7) is lower than the rate of extension in activation of the impact lid (2).

10. The impact protection system according to claim 1, characterized in that the stowage container (7) is designed as a retractable and extensible drawer.

11. The impact protection system according to claim 1, characterized in that the driving device (4) extends the impact lid (2) into a predetermined preventive position when the passenger has not engaged his seatbelt while the vehicle is being driven.

12. The impact protection system according to claim 11, characterized in that the driving device (4) stops the extension of the impact lid (2) into its preventive position when a contact sensor senses contact with an obstacle.

13. The impact protection system according to claim 11, characterized in that the impact lid (2) cooperates with a visually discernible warning to engage the seatbelt, such that the impact lid (2) conceals said warning in its passive position and releases the view of the warning when moved into its preventive position.

14. The impact protection system according to claim 11, characterized in that the driving device (4) automatically retracts the impact lid (2) into the passive position as soon as the passenger has engaged his seatbelt.

15. The impact protection system according to claim 11, characterized in that the driving device (4) is designed so that the rate of adjustment for adjusting the impact lid (2) into its preventive position and back is lower than the rate of extension in activation of the impact lid (2).

16. The impact protection system according to claim 1, characterized in that a clamping sensor stops the retraction movement of the impact lid (2) when it senses contact between the impact lid (2) and an obstacle.

* * * * *